United States Patent
Rintz

[11] Patent Number: 6,051,787
[45] Date of Patent: *Apr. 18, 2000

[54] LIGHT SWITCH COVER

[76] Inventor: William J. Rintz, 819 NE. 1st Ct., Delray Beach, Fla. 33483

[*] Notice: This patent is subject to a terminal disclaimer.

[21] Appl. No.: 09/009,710

[22] Filed: Jan. 20, 1998

Related U.S. Application Data

[63] Continuation-in-part of application No. 08/826,643, Apr. 4, 1997, Pat. No. 5,874,693, which is a continuation-in-part of application No. 08/769,623, Dec. 18, 1996, Pat. No. 5,811, 730, which is a continuation-in-part of application No. 08/640,538, May 2, 1996, Pat. No. 5,811,729.

[51] Int. Cl.$^7$ ....................................................... H05K 5/03
[52] U.S. Cl. .......................... 174/66; 220/241; 200/302.3
[58] Field of Search ........................ 174/66, 67; 220/241, 220/242, 3.8; D8/353; D13/177; 200/302.3, 333, 302.1, 317, 310

[56] References Cited

U.S. PATENT DOCUMENTS

| | | | |
|---|---|---|---|
| D. 141,030 | 4/1945 | Wheeler, Jr. | D8/353 |
| 2,984,725 | 5/1961 | Hubbell et al. | 200/302.3 |
| 3,028,467 | 4/1962 | Hubbell | 200/302.3 |
| 3,188,438 | 6/1965 | Lovasco | 200/333 |
| 3,680,237 | 8/1972 | Finnerty, Sr. | 40/130 M |
| 4,004,120 | 1/1977 | Lee | 200/310 |
| 4,488,024 | 12/1984 | Colgate | 200/330 |
| 5,811,729 | 9/1998 | Rintz | 174/66 |
| 5,811,730 | 9/1998 | Rintz | 174/66 |
| 5,874,693 | 2/1999 | Rintz | 174/66 |

*Primary Examiner*—Dean A. Reichard
*Attorney, Agent, or Firm*—Malin, Haley & DiMaggio, P.A.

[57] ABSTRACT

A light switch cover is disclosed for use with conventional "rocker" and "toggle" type switches. The cover generally includes a mounting bracket which is attached to the electrical box, along with the switch and a face plate which is attached to the mounting bracket. For "rocker" type switches, the face plate is preferably constructed from a soft material to allow the user to operate the covered "rocker" switch, but can be made of a combination of hard and soft materials. For "toggle" type switches an aperture is provided in the face plate to operate the toggle. Preferably, the outer surface of the face plate is provided with a decorated design or other indicia. The light switch can also be utilized where more than one switch is provided. For multiple "rocker" switches, a diverter bar is provided on the mounting bracket, to absorb pressure being asserted on one "rocker" switch from also transferring to an adjacent "rocker" switch and inadvertently turning "off" or "on" the adjacent "rocker" switch. An electroluminescent lighting sheet can also be provided between the face plate and mounting bracket to highlight and enhance the decorative features of the present invention light switch cover. A battery back-up and power loss sensing circuit can be included that illuminates the lighting sheet whenever power to the light switch is lost. Upon loss of power, the lighting sheet can be illuminated steadily or can blink at a preselected frequency. An on/off switch can be provided to manually turn the illuminated light switch cover off. The invention can be utilized with pressure sensitive dome-type switches.

20 Claims, 12 Drawing Sheets

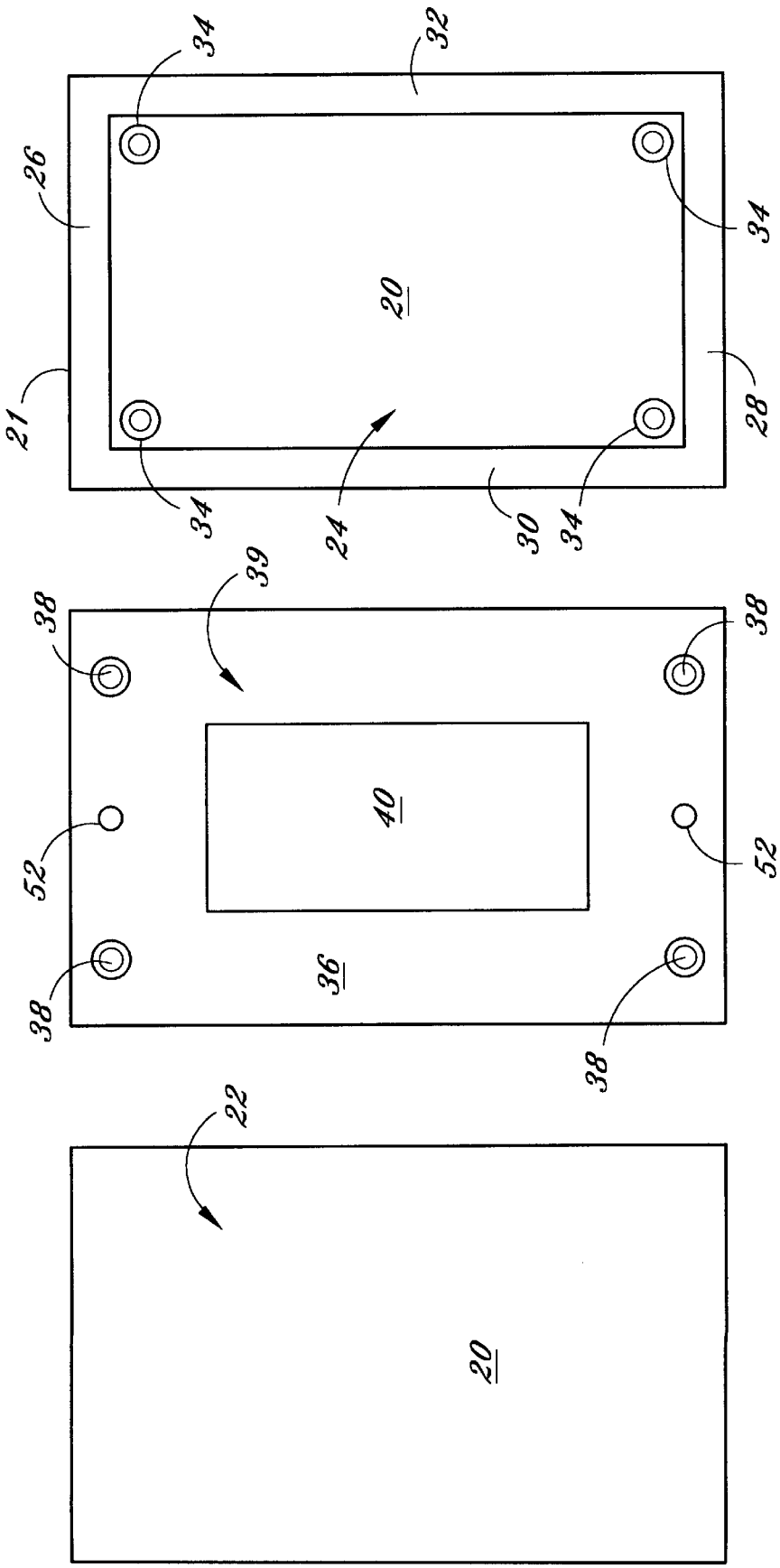

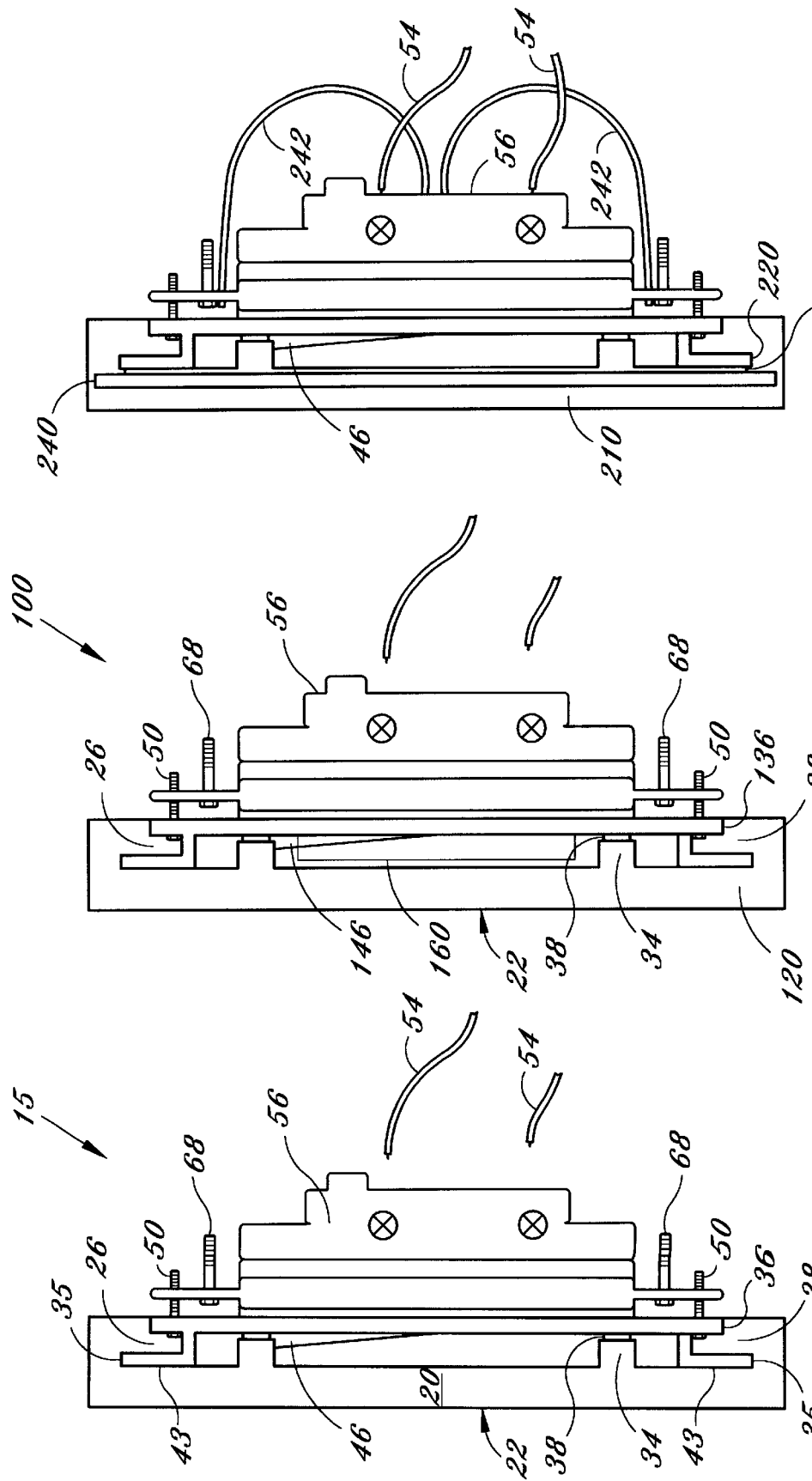

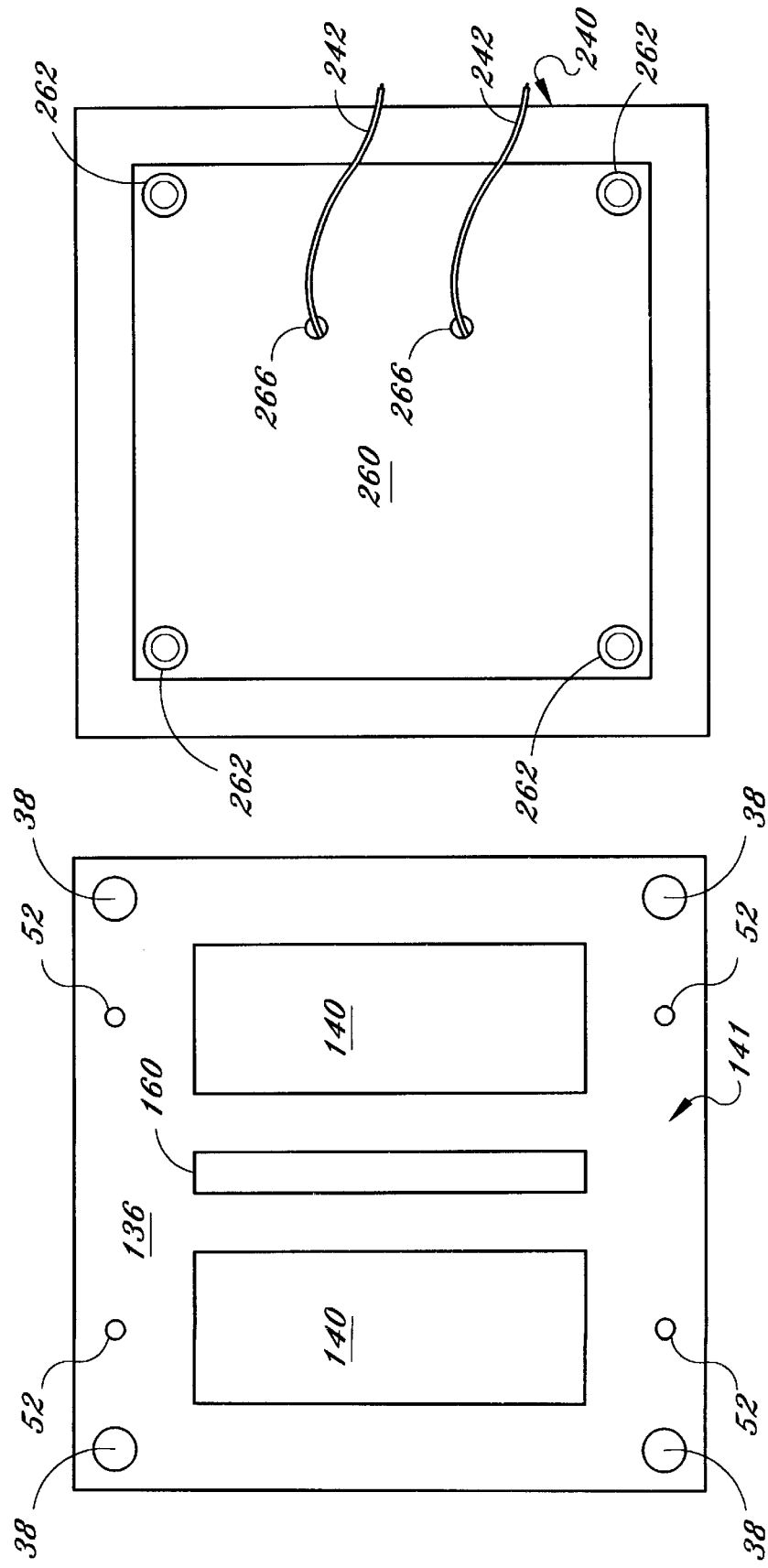

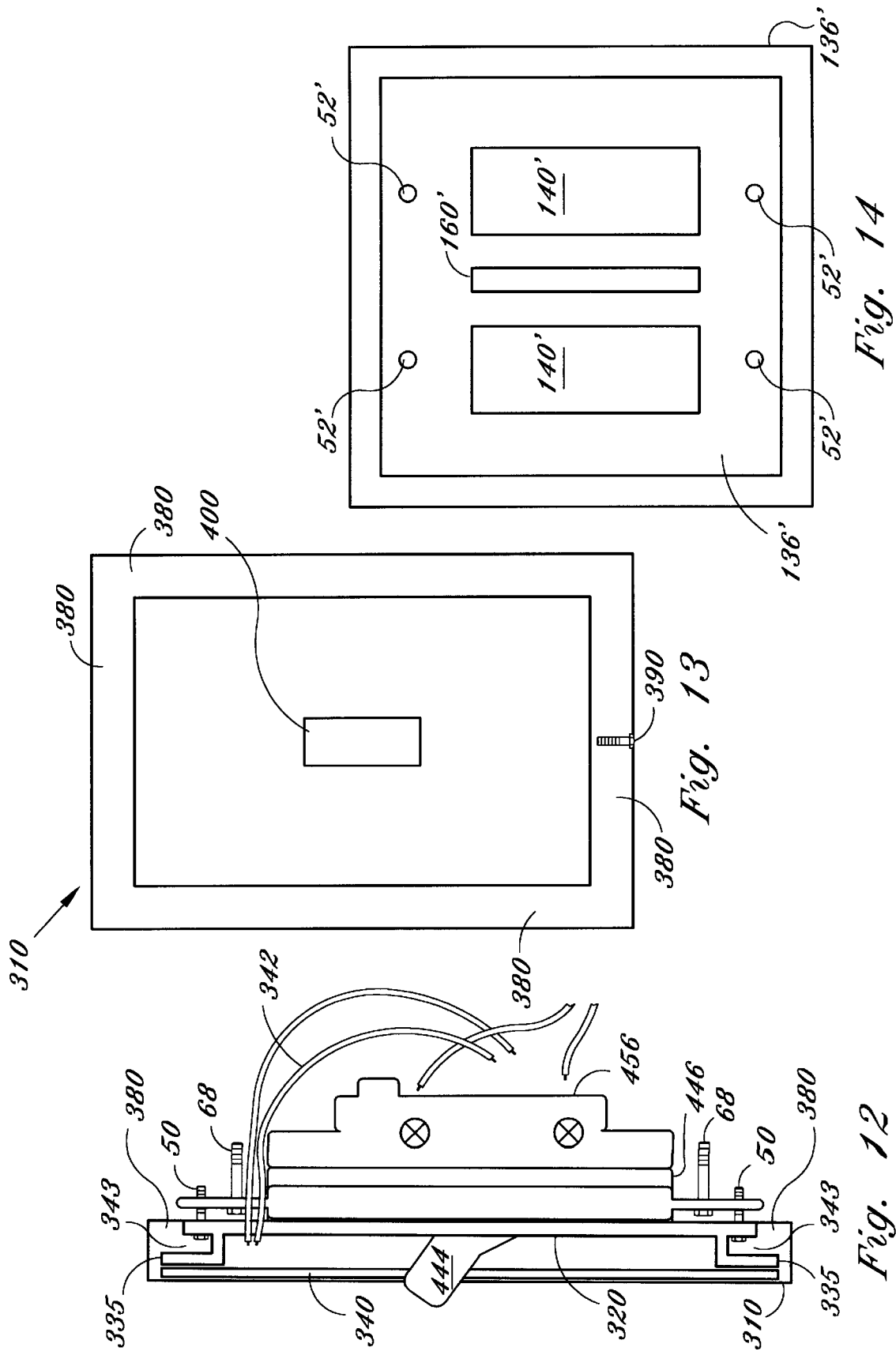

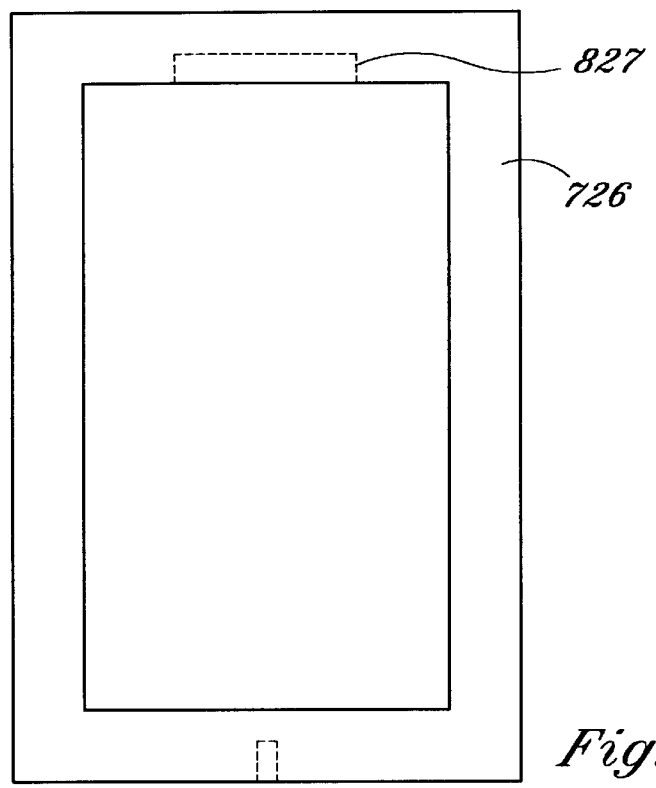
*Fig. 25*
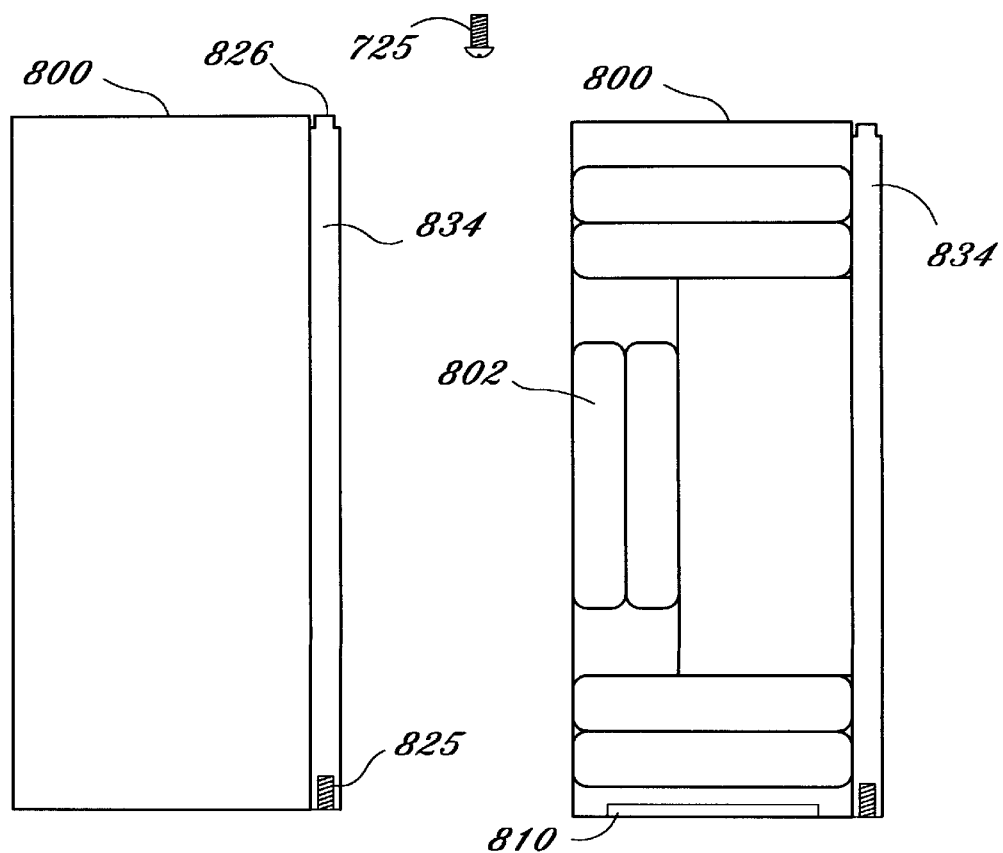
*Fig. 27*     *Fig. 28*

LIGHT SWITCH COVER

CROSS-REFERENCE TO RELATED APPLICATIONS

This is a continuation-in-part of application Ser. No. 08/826,643, filed on Apr. 4, 1997, now U.S. Pat. No. 5,874,693, which is a continuation-in-part of application Ser. No. 08/769,623, filed on Dec. 18, 1996, now U.S, Pat. No. 5,811,730, which is a continuation-in-part of application Ser. No. 08/640,538, now U.S. Pat. No. 5,811,729 filed on May 2, 1996.

STATEMENT REGARDING FEDERALLY SPONSORED RESEARCH OR DEVELOPMENT

Not applicable.

BACKGROUND OF THE INVENTION

1. Field of the Invention

This invention relates generally to light switch covers and receptacle covers particularly to a combination decorative light switch cover and mounting bracket for use with "rocker", "toggle", and other type light switches.

2. Description of the Prior Art

Rigid light switch covers have been utilized in the past for safety means. Three disadvantages associated with the use of rigid light switch covers are (1) inoperability of covered light switch; (2) unattractiveness of the cover; and (3) difficulties in attaching the rigid light switch cover. To utilize the covered switch, the user must each time remove the cover. Conventional light switch covers have not been use in the past as a decorative element, but merely for safety purposes.

Some examples of previous cover devices include: U.S. Pat. No. 4,760,227 issued to Boxer (the "Boxer" device); U.S. Pat. No. 4,757,168 issued to Fujiyoshi et al (the "Fujiyoshi" device); U.S. Pat. No. 5,457,286 issued to Flasz (the "Flasz" device); and U.S. Pat. No. 4,488,024 issued to Colgate (the "Colgate" device).

The Boxer device provides a sliding switch cover assembly which comprises a switch plate on which a toggle actuator is mounted by two sets of vertically aligned pins extending from the switch plate. Vertical slots are provided in the actuator in alignment with the two sets of vertically aligned pins. The toggle switch is turned off and on by the actuator plate which slides up and down the vertically aligned pins.

The Fujiyoshi device provides a switch device comprising a mounting frame having a switch body. The switch is designed to be attachable or detachable from a switch working portion.

The Flasz device provides a face plate assembly which is secured over an electrical switch or output source. The assembly includes a frame structure having at least one opening in a flat central area which surrounds an electricity controlled casing. A plurality of key plates are provided, with one key plate being positioned so that it can pivot.

The Colgate device provides wall switch cover and actuator which is used with a standard wall toggle switch. The cover and actuator comprise a frame which is held in position on the switch and the switch cover plate. The switch actuator is held within the frame, and portions of the switch actuator Abut opposite sides of the toggle switch. A cover is also mounted on the frame over the switch actuator.

In new construction, "rocker" type light switches have virtually replaced previously used "toggle" type light switches. Thus, what is needed in the art is a light switch cover, which (1) can be utilized with "rocker" type light switches; (2) completely cover the underneath light switch; (3) provide a decorative element which adds artistic value to the room; (4) provides an easy attachment method for attaching the cover; and (5) can be utilized with "toggle" type light switches. It is therefore, to the effective resolution of the aforementioned problems and shortcomings of the prior art that the present invention is directed.

BRIEF SUMMARY OF THE INVENTION

The present invention provides a light switch cover which is preferably, utilized with a conventional "rocker" type switch, and alternately can be utilized with a conventional "toggle" type switch, and/or a tactile or pressure sensitive, or dome type switch. The cover includes a mounting bracket which is attached to the electrical box, along with the light switch and a face plate which is attached to the mounting bracket. The face plate is preferably constructed from a soft material, to allow the user to operate with a covered "rocker" switch or a pressure sensitive switch. The face plate can alternately be provided with an opening to provide access for the toggle of a "toggle" type switch. Preferably, the outer surface of the face plate is provided with a decorated design, logo, picture, photograph, wording, indicia, or any other decorative, informational or promotional indicia.

The present invention can also be utilized where more than one switch is provided. For multiple "rocker" type switches, a diverter bar is provided on the mounting bracket, to absorb pressure being asserted on one "rocker" switch from also transferring to an adjacent "rocker" switch and inadvertently turning "off" or "on" the adjacent "rocker" switch.

Additionally, an electroluminescent lighting sheet can also be provided between the face plate and mounting bracket to highlight and enhance the decorative features of the present invention light switch cover. The lighting sheet receives power via associated wires that are connected to the conventional switch box.

A battery back-up and sensing circuit can be included that automatically illuminates the light switch cover, in any of the embodiments of the present invention, whenever a loss of power is sensed. Thus, if power is lost, light switch covers utilizing the present invention with the battery back-up and sensing circuit, would automatically turn on, providing "night-light" type illumination within the house, or wherever the light switch cover is used. The battery back-up and sensing circuit can include a manual switch that turns the illuminated light switch cover off.

Accordingly, it is an object of the present invention to provide a light switch cover and mounting bracket for use in conjunction with a rocker switch.

It is another object of the present invention to provide a light switch cover that fully shields the rocker switch and receptacle from external access for safety purposes.

It is a further object of the present invention to provide a light switch cover made of flexible materials to allow the covered rocker switch to be operable.

It is still another object of the present invention to provide a light switch cover which provides aesthetic features.

It is yet another object of the present invention to provide a light switch cover which will illuminate when the rocker switch is in an "off" position.

It is yet a further object of the present invention to provide a light switch cover and mounting bracket for use in conjunction with a toggle switch.

It is still a further object of the present invention to provide a light switch cover which includes a battery back-up and sensing circuit that illuminates the light switch cover whenever power is lost.

It is another object of the present invention to provide a light switch cover that illuminates whenever power is lost and that includes a manual switch to turn the light switch cover off.

In accordance with these and other objects which will become apparent hereinafter, the instant invention will now be described with particular reference to the accompanying drawings.

BRIEF DESCRIPTION OF THE SEVERAL VIEWS OF THE DRAWINGS

This invention may be better understood by reference to the drawings in which:

FIG. 2 illustrates a front view of the face plate member of the light switch cover shown in FIG. 1;

FIG. 3 illustrates a front view of the mounting bracket member of the light switch cover shown in FIG. 1;

FIG. 4 illustrates a back view of the face plate member shown in FIG. 1;

FIG. 5 illustrates a side sectional view of the first embodiment light switch cover;

FIG. 6 illustrates a front view of a mounting bracket in accordance with a second embodiment of the present invention;

FIG. 7 illustrates a side sectional view of the second embodiment light switch cover;

FIG. 9 illustrates a side sectional view of the third embodiment light switch cover;

FIG. 10 illustrates a perspective back view of an attachment sheet in accordance with the third embodiment light switch cover;

FIG. 12 illustrates a side sectional view of the alternate embodiment shown in FIG. 11;

FIG. 13 illustrates a front view of the face plate member of the light switch cover shown in FIG. 11;

FIG. 14 illustrates a front view of a mounting bracket in accordance with an alternate embodiment of the present invention;

FIG. 25 is a front elevational view of the cover of the embodiment of FIGS. 23 and 24.

FIG. 27 is a side elevational view of a portable embodiment of the present invention.

FIG. 28 is a side elevational view partially cut-away of that of FIG. 27.

DETAILED DESCRIPTION OF THE INVENTION

Figure 1:
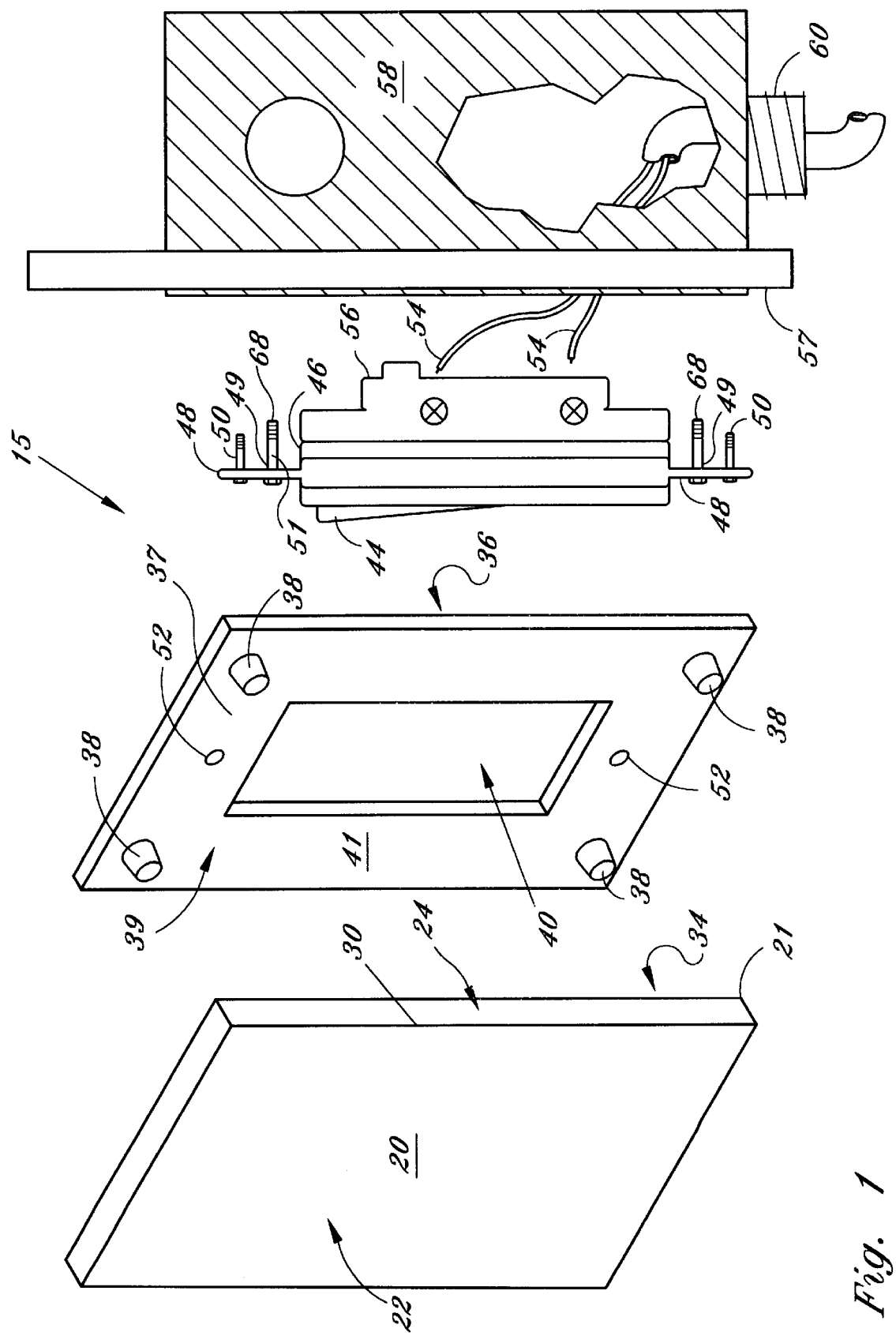
FIG. 1 illustrates an exploded view of a first embodiment for the light switch cover in accordance with the present invention.

As seen in FIGS. 1 through 4, a first embodiment of the present invention light switch cover is shown and generally designated as reference numeral 15. Cover 15 generally consists of a face plate 20 and a mounting bracket 36.

Face plate 20 consists of a body member 21 having an outer surface 22 and inner surface 24. A top lip 26, a bottom lip 28, a first side lip 30, and a second side lip 32 can be provided and are preferably, constructed integral to respective edge portions of body member 21. Face plate 20 is preferably constructed from a castable, soft, flexible material such as neoprene, silicone, vinyl, etc., to allow a conventional rocker switch 46 to be operated while face plate 20 is disposed over rocker switch 46 for safety purposes. Though not preferred, face plate 20 can also be constructed from a rigid plastic or the like. However, with the rigid material, the user cannot utilize covered rocker switch 46. Outer surface 22 can be provided with any type of decorative design or indicia. Outer surface 22 can also be provided with a hand carved design, such as replicas of famous art. Additionally, a screen print design can be directly applied to face plate 20. As such, a plurality of interchangeable face plates 20 each having a different decorative design can be provided depending on the mood of the user.

A plurality of female receiving ports 34 are provided on inner surface 24 of body member 21 for receipt of respective dowel or peg members 38 associated with mounting bracket 36, discussed in detail below. Preferably, four ports 34 and pegs 38 are provided. However, such is not limiting and a different number of ports 34 and pegs 38 can be utilized and is considered within the scope of the present invention.

Mounting bracket 36 includes a body member 37 having an inner surface 39 and an outer surface 41. Mounting bracket 36 can be constructed from a rigid epoxy, rigid plastic, castable plastic, etc. An opening 40 is provided through body member 37 to allow a protruding switch portion 44 of a rocker switch 46 to pass through when mounting bracket 36 is properly attached. As stated above, a plurality of protruding pegs 38 are provided and attached to inner surface 39 of body member 37. Mounting bracket 36 is also provided with preferably two apertures 52 for receipt of mounting screws 50. Preferably, apertures 52 are disposed above and below opening 40, however, other locations for aperture 52 are considered within the scope of the invention.

A wall 57 has embedded therein an electrical box 58 and conduit 60. Conduit 60 houses electrical conducting wires 54. The exposed ends of electrical wires 54 are attached to a switch box 56 by conventional means. Switch box 56 is housed within electrical box 58 by conventional means. Switch box 56 is attached to a back portion of rocker switch 46, as well as being operatively associated with rocker switch 46. Rocker switch 46 is provided with outer flanges 48 preferably at a top and bottom end of rocker switch 46. Flanges 48 are each provided with an aperture 49 for receipt of mounting screws 68 which attach rocker switch 46 to electrical box 58.

The location of apertures 52 in body member 37 are chosen to align with mounting bracket attachment apertures of rocker switch 46 which are preferably disposed above or below apertures 49, to allow a respective mounting screw 50 to be inserted through apertures 52 and mounting bracket attachment aperture for attaching mounting bracket 36 to rocker switch 46 when assembling light switch cover 15. The mounting bracket attachment apertures have been previously provided on rocker switch 46 for attachment of a conventional light face plate.

To assemble light switch cover 15, mounting screws 68 are each inserted in their respective apertures 49 and corresponding conventional screw passageways (not shown) associated with embedded electrical box 58, to attach rocker switch 46 to electrical box 58. Mounting screws 50 are then inserted through respective apertures 52 and mounting bracket attachment apertures for attaching mounting bracket 36 to rocker switch 46. Preferably, all passageways and apertures, described in this paragraph, have interior threads which mate with exterior threads of screws 50 and 68 through use of conventional means such as a regular or Phillips head screwdriver.

Once mounting screws 50 and 68 have been fully turned or inserted within their respective apertures and electrical box passageways, mounting bracket 36 is disposed flush or abutting wall 57 and a light activating portion 44 of rocker switch 46 protrudes out of wall 57 and through opening 40.

When attaching face plate 20 to mounting bracket 36, female ports 34 are aligned with their respective protruding pegs 38, and face plate 20 is moved to allow each port 34 to receive its respective peg 38. The inner diameter of port 34 is slightly larger than the outer diameter of its respective peg 38 to provide a snug and tight fit to provide a secure attachment of face plate 20 to mounting bracket 36. The depth of face plate 20, which is defined by its lip members 26, 28, 30 and 32 is preferably approximately equal to the protruding length of pegs 38 to allow the edges of lip members 26, 28, 30 and 32 to abut wall 57 when face plate 20 is properly attached to mounting bracket 36. As face plate 20 is preferably constructed from a flexible material, rocker switch 46 can still be operated, while face plate 20 provides a safety means, as well as a decorative feature, by fully covering rocker switch 46.

As an additional safety feature, a second attachment point for attaching face plate 20 to mounting bracket 36 can be provided. As best seen in FIG. 5, lip members 26, 28, 30 and 32 define an inner peripheral groove 35 which mates with a mounting bracket peripheral flange 43 to help prevent face plate 20 from inadvertently being detached from mounting bracket 36. When attaching face plate 20 having a groove 35 to mounting bracket 36 having flange 43, initially the top portion of flange 43 is position within the portion of groove 35 defined by top lip member 26. Next the side portions of flange 43 and positioned within the portions of groove 35 defined by side lip members 30 and 32, while also inserting pegs 38 within the respective receiving ports 34. Lastly the bottom portion of flexible face plate 20 is pulled down by the installer's hands or a small grabbing tool to allow the bottom portion of flange 43 to be inserted within the portion of groove 35 defined by lip member 28.

Once properly disposed, the installer releases the pull on the bottom portion of face plate 20, providing for a very secure and tight fit between face plate 20 and mounting bracket 36.

To remove face plate 20, the steps described above for attaching face plate 20 are performed in reverse with the installer initially pulling down on the bottom portion of face plate 20 with either his or her hands, or by the previously mentioned small grabbing tool, thus causing the bottom portion of flange 43 to no longer be disposed within groove 35.

Once light switch cover 15 is properly attached, a person wishing to position rocker switch 46 in an "off" or "on" position, merely presses on soft face plate 20, which allows the person to also directly press switch 46.

The teachings of the first embodiment of the present invention can also be utilized when more than one rocker switch 146 is provided. As seen in FIGS. 6 and 7, a second embodiment light switch cover 100 of the present invention is illustrated incorporating a mounting bracket 136 having multiple openings 140 for receiving multiple protruding rocker switches 146. Face plate 120 is attached to mounting bracket 136 similar to the two attachment methods (groove 35/flange 43 and/or ports 34/pegs 38) described above. Face plate 120 can be structured and constructed identical to face plate 20 of the first embodiment, with the exception of face plate 120 being wider in its width in order to cover all of the rocker switches 146 provided.

Mounting bracket 136 is structured similar to mounting bracket 36, with the exception of mounting bracket 136 being wider in its width in order to provide a plurality of openings 140 equal to the number of rocker switches 146 provided. Additionally, mounting bracket 136 is provided with a pressure absorption diverter bar 160 between each opening 140 and protruding outward from outer surface 141. Diverter bar 160 can also be constructed from a rigid epoxy, rigid plastic, castable plastic, etc. Furthermore, diverter bar 160 can be constructed integral with mounting bracket 136 or attached thereto by conventional means such as adhesives, hook and loop fasteners, tape, etc.

Diverter bar 160 protrudes outward at least slightly further than the rocker switches 146 which are adjacent each side of diverter bar 160. Preferably, diverter bar 160 does not protrude as far outward as pegs 38 so not to interfere with the attachment of face plate 120 to mounting bracket 136 by the insertion of pegs 38 within female receiving ports 34.

Diverter bar 160 allows for the on or off operation of a singular rocker switch 146 without affecting the other rocker switches. Thus, pressure bar 160 absorbs pressure placed on face plate 120 so that only the intended switch is turned either on or off as desired. Though not shown, it is to be understood that a diverter bar 160 can be provided on mounting bracket 146 between each pair of rocker switches 146 where more than two rocker switches are provided.

Figure 8:
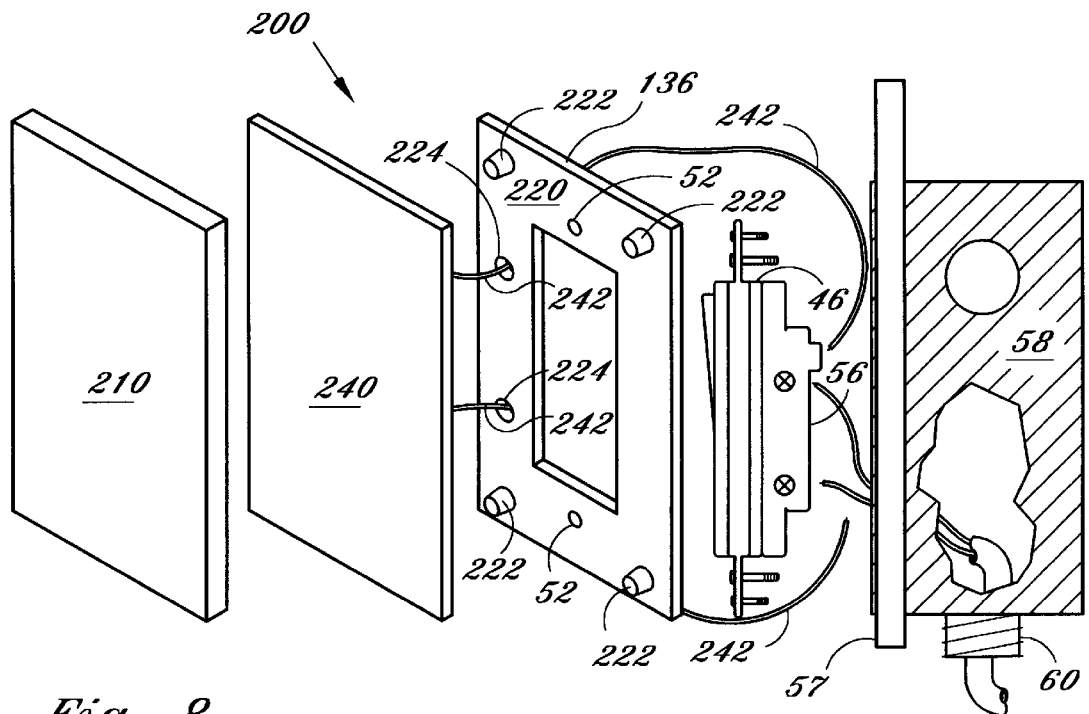
FIG. 8 illustrates an exploded view of a third embodiment light switch cover in accordance with the present invention.

FIGS. 8 through 10 illustrate a third embodiment of the present invention wherein the light switch cover is generally designated as reference numeral 200. In this embodiment, light switch cover 200 is generally provided with a face plate 210, mounting bracket 220, and electroluminescent lighting sheet or panel 240.

Electroluminescent lighting sheet 240 highlights or enhances a design disposed on an outer surface of face plate 210, or itself can be a lighting effect design in lieu of a design on the outer surface of face plate 210. Additionally, a screen print design can be directly applied to lighting sheet 240, as well as face plate 210. Where a screen print design is applied to lighting sheet 240, face plate 210 can merely be a clear cover. Lighting sheet 240 can provide cool, bright, uniform panels of light which can create a combination of various colors of light or a single color depending on the user's preference. Lighting sheet 240 can also be constructed to provide light patterns in an endless amount of shape configurations. Lighting sheet 240 will not de-laminate in use and the tiny lamps associated with sheet 240 are highly resistant to moisture and humidity. Lighting sheet 240 provides a cool light so not to affect face plate 210.

Lighting sheet 240 can be disposed between the female receiving ports of face plate 210. Lighting sheet 240 includes a pair of wires 242 which are conventionally connected to switch box 56 to energize lighting sheet 240. Wires 242 are fed from lighting sheet 240 through apertures 224 of mounting bracket 220 to switch box 56. To provide a larger lighting sheet 240, the female ports associated with face plate 210 can be disposed on the back surface of lighting sheet 240, allowing lighting sheet 240 to be snugly inserted in the area defined by the lip members of face plate 210.

Furthermore, in lieu of providing the female ports on lighting sheet 240 (which would mate with protruding pegs 222), an additional attachment sheet 260 (FIG. 10), having female ports 262 on its outer surface can be provided. Attachment sheet 260, as well as lighting sheet 240, are constructed from a soft material, in order to operate covered rocker switch 46. Attachment sheet 260 is provided with apertures 266 for feeding therethrough of wire 242 coming from lighting sheet 240.

Face plate 210 can have a lip member, defining a mating groove, extending around it periphery, similar to the lip member of face plate 20 (FIG. 1). Alternatively, in lieu of face plate 210 having lip members, attachment sheet 260 can be provided with lip members around its periphery which define a groove for mating with the outer flange member of the bracket member.

Lighting sheet 240 is sandwiched between face plate 210 and attachment sheet 260, and attachment sheet 260 is attached to face plate 210 by conventional means such as silicone. Once attachment sheet 260 is attached, wires 242 protrude out of apertures 266 and female ports 262 mate with protruding peg members 222 of mounting bracket 220. Prior to attaching mounting bracket 220 to electrical box 58, wires 242 are routed through apertures 224 of mounting bracket 220 and connected to switch box 56. Once wires 242 are properly attached, mounting bracket 220 is attached to electrical box 58, as previously described above for the first embodiment of the present invention.

Face plate 210 and mounting bracket 220 can be provided with a lip/groove member and outer flange member, respectively, which are similar in construction and operation to the lip and flange members described for the first embodiment of the present invention. Additionally, the other features of light switch cover 200, not discussed, are similar to those discussed above for the first embodiment of the present invention.

Similar to the second embodiment of the present invention, a light switch cover assembly, including an electroluminescent lighting sheet can also be utilized where more than one rocker switch is provided. Where more than one rocker switch is provided, the lighting sheet is larger in width as compared to lighting sheet 240 and the length of its width is dependent on the number of rocker switches provided. Additionally, a diverter bar, as described above, is provided. Also, the safety attachment of a mounting bracket outer flange and flange groove member, as described above, can also be provided for all of the embodiments of the present invention. Furthermore, where an attachment sheet is utilized, the attachment sheet is larger in width than attachment sheet 260 and the length of its width is dependent on the number of rocker switches provided.

Wires 242 can be connected to switch box 56, by conventional means, so that when rocker switch 46 is in an "off" position, lighting sheet 240 is illuminated and when rocker switch 46 is in an "on" position, lighting sheet 240 is off. Lighting sheet 240 can have a useful life of one hundred thousand (100,000) hours and can be wired to 110 Volts AC.

Figure 11:
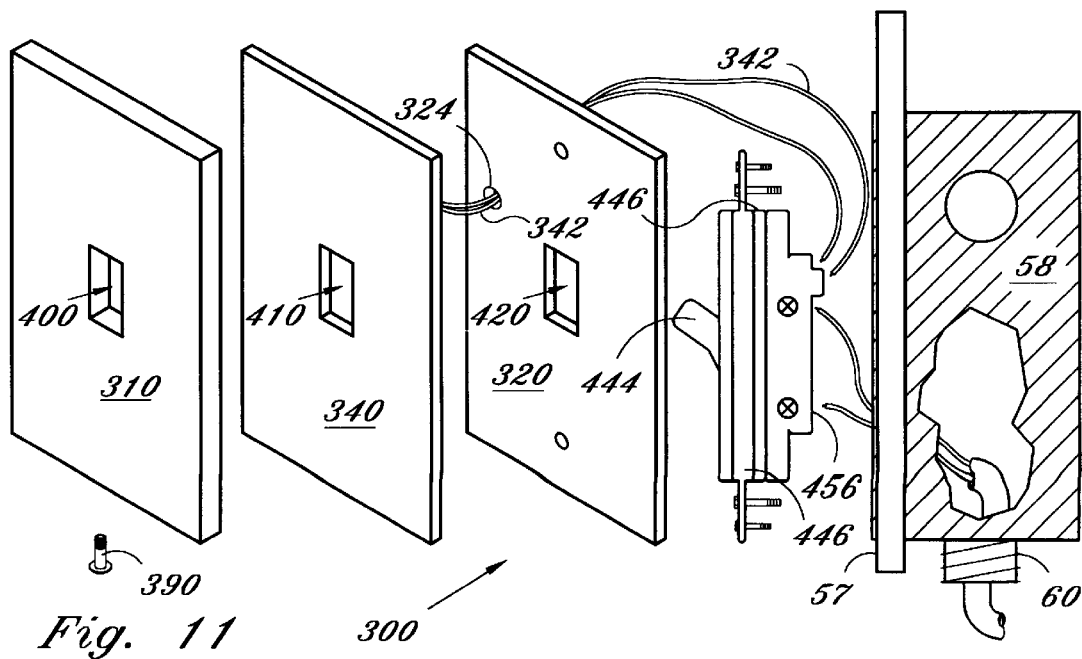
FIG. 11 illustrates an exploded view of an alternate embodiment light switch cover for use with a toggle switch in accordance with the present invention.

FIGS. 11 through 13 illustrate an alternate embodiment of the present invention, for utilization with a "toggle" type switch, wherein the light switch cover is generally designated as reference numeral 300. In this embodiment, light switch cover 300 is generally provided with a face plate 310, mounting bracket 320, and electroluminescent lighting sheet or panel 340. Face plate 310, mounting bracket 320, and electroluminescent lighting sheet or panel 340, include apertures 400, 410, and 420, respectively, to receive toggle 444 of toggle switch 446. Toggle switch 446 is connected to switch box 456 which mounts in electrical box 58 in a similar manner to the other embodiments described herein above.

Electroluminescent lighting sheet 340 highlights or enhances a design that can be disposed on an outer surface of face plate 310, or itself can be a lighting effect design in lieu of a design on the outer surface of face plate 310. Additionally, a screen print design can be directly applied to lighting sheet 340, as well as face plate 310. Where, a screen print design is applied to lighting sheet 340, face plate 310 can have, in at least a portion, a clear cover. Lighting sheet 340 can provide cool, bright, uniform panels of light which can create a combination of various colors of light or a single color depending on the user's preference. Lighting sheet 340 can also be constructed to provide light patterns in an endless amount of shape configurations. Lighting sheet 340 will not de-laminate in use and the tiny lamps associated with sheet 340 are highly resistant to moisture and humidity. Lighting sheet 340 provides a cool light so not to affect face plate 310.

Lighting sheet 340 includes a pair of wires 342 which are conventionally connected to switch box 456 to energize lighting sheet 340. Wires 342 are fed from lighting sheet 340 through aperture 324 of mounting bracket 320 to switch box 456. Lighting sheet 340 can be snugly inserted in the area defined by the perimeter lip members of face plate 310.

The perimeter lip members of face plate 310 define a mating groove 335, as seen in FIG. 12, extending around the periphery of plate 310, similar to the lip members of face plate 20 (FIG. 1), for mating with the outer flange member 343 of mounting bracket 320. Face plate 310 can have a rigid perimeter area 380, as seen in FIG. 13. Set screw 390 can be used to secure face plate 310 firmly to mounting bracket 320, as seen in FIG. 12.

Lighting sheet 340 is sandwiched between face plate 310 and mounting bracket 320. Prior to attaching mounting bracket 320 to electrical box 58, wires 342 are routed through aperture 324 of mounting bracket 320 and connected to switch box 456. Once wires 342 are properly attached, mounting bracket 320 is attached to electrical box 58, as previously described above for the first embodiment of the present invention.

Face plate 310 and mounting bracket 320 can be provided with a lip/groove member 335 and outer flange member 343, respectively, which are similar in construction and operation to the lip and flange members described for the first embodiment of the present invention. However, face plate 310 can have a rigid perimeter frame portion 380 that can utilize set screw 390 to securely attach face plate 310 to mounting bracket 320. The other features of light switch cover 320, not discussed, are similar to those discussed above for the first embodiment of the present invention.

Similar to the second embodiment of the present invention, a light switch cover assembly, including an electroluminescent lighting sheet can also be utilized where more than one toggle switch is provided. Where more than one switch is provided, the lighting sheet is larger in width as compared to lighting sheet 340, and its width, as well as the number of apertures 410, is dependent on the number of toggle switches provided. A diverter bar, as described above, is not required when using toggle switches.

Wires 342 can be connected to switch box 456, by conventional means, so that when toggle switch 446 is in an "off" position, lighting sheet 340 is illuminated and when rocker switch 446 is in an "on" position, lighting sheet 340 is off. Lighting sheet 340 can have a useful life of one hundred thousand (100,000) hours and can be wired to 110 Volts AC.

The attachment of a face plate having a rigid frame or perimeter to the mounting bracket outer flange, by a flange groove member and set screw, as described above, can be provided for all of the embodiments of the present invention. For example, mounting bracket 136', shown in FIG. 14 is essentially mounting bracket 136 of the second embodiment of the present invention, as described and shown in FIG. 6, but without ports 34. The other features of mounting bracket 136' are the same as mounting bracket 136, and have been designated using the same reference numerals with a prime (') attached. Attachment of mounting bracket 136' and a switch cover to a rocker switch, in accordance with the present invention, follows the description herein above for the embodiment utilizing a toggle switch as described and shown in FIGS. 11–13.

The present invention provides a light switch cover which includes a lighted a safety device, and that permits the user to utilize the covered light switch. Furthermore, the present invention allows an individual to continue to use a covered light switch without having the light switch itself exposed and part of the design. Preferably, the present invention is installed by a certified electrician for safety purposes, or at least by a competent individual who carefully follows installation instructions. In all embodiments of the present invention, no modification of how the switch is attached to the electrical box is necessary. The mounting bracket, for all embodiments, is attached to the switch, normally where a conventional plate member is attached.

It should also be understood, that the present invention can be utilized with other receptacles and light switches, such as plug receptacles, in addition to its preferred use with "rocker" and "toggle" type switches.

Figure 15:
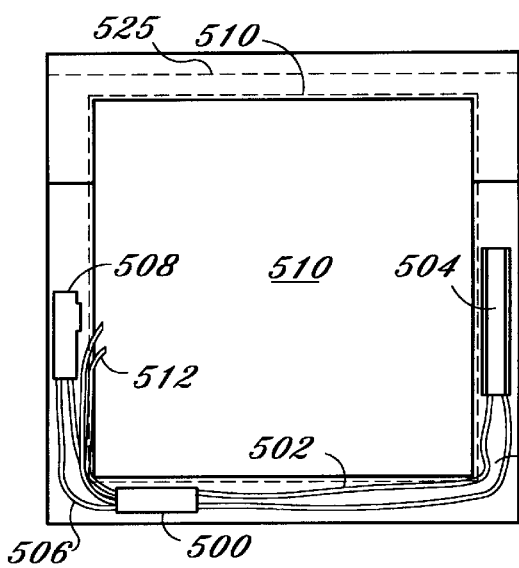
FIG. 15 is a rear elevational view showing the battery back-up and sensing circuit of the present invention.

Referring now to FIG. 15, a battery back-up and sensing circuit, for use with all of the embodiments of the present invention, illuminates the switch plate whenever power to the light switch is interrupted. Sensing circuit 500 is connected by wires 502 to battery 504, and by wires 506 to microswitch 508. Sensing circuit 500 includes a power inverter to illuminate, for example, electroluminescent lighting sheet 510, through wires 512.

As discussed herein above for the other embodiments of the present invention, lighting sheet 510 can serve as a flexible cover to operate one or more rocker switches or be configured to operate toggle switches or plug receptacles, and may include a decorative appearance or can be plain. Lighting sheet 510 can be made as a single electroluminescent sheet or can be a laminate of an electroluminescent sheet and a clear membrane.

A suitable sensing circuit 500 can be obtained from Capital Asset Engineering, 10650 72nd. St., Largo, Fla. 33777. The device from Capital Asset Engineering is approximately 1.645 inches long, 0.4 inches high, and 0.9 inches wide, and can convert 3, 6, 9, or 12 volts DC into AC in the range from about 60 volts AC to about 300 volts AC, and can provide frequencies in the range of about 100 hertz to about 1600 hertz. Preferably, a 3 VDC battery will be used and converted to 90 volts AC at a frequency of 600 Hz and a blink rate of 2 times per second.

It should be recognized by one of ordinary skill in the art, that other comparable power loss sensing and inverter circuits can be substituted for the Capital Asset Engineering device described above.

Whenever power is lost to the lighting switch, microswitch 508 is activated to deliver battery power to the inverter contained within circuit 500. Circuit 500 then delivers inverted battery power to operate lighting sheet 510. Sheet 510 can be set to illuminate steadily or can blink on and off at a preselected frequency, as described above.

Battery 504 can be any number of selected batteries, but preferably is a lithium based battery to provide a compact battery with extended battery life.

Battery 504, circuit 500, and switch 508 are preferably sized to fit within a rigid perimeter framework 514, and within the perimeter framework of the alternate embodiments described herein above. Alternately, battery 504, circuit 500, and switch 508 can be attached to, or behind, the mounting bracket of any of the embodiments herein described above that do not use a rigid framework. Lighting sheet 510 can be disposed within a recess in perimeter framework 514 as shown in FIG. 15. As stated above, lighting sheet 510 can be replaced by any of the embodiments as described herein above. Hence, the battery back-up and sensing circuit can be utilized with any of the embodiments of the present invention.

Figure 16:
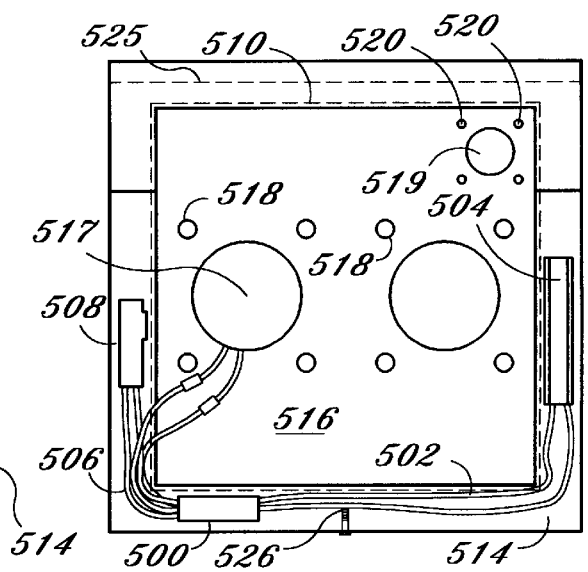
FIG. 16 is a rear elevational view showing the battery back-up and sensing circuit, and the pressure sensitive switches of the present invention.

Referring now to FIG. 16, another embodiment of the present invention is shown when using one or more pressure sensitive or "domed" light switches, and the battery back-up and sensing circuit as described above. In this embodiment, one or more pressure sensitive dome switches, shown as two in FIG. 16, are used in place of rocker or toggle type switches, and are mounted in a manner similar to the rocker and toggle switches discussed herein above.

A membrane 516, which may be flexible, can have one or more apertures 517 (shown here with two) to receive one or more pressure sensitive switches (not shown). Membrane 516 can be permanently laminated to an electroluminescent sheet such that membrane 516 and the electroluminescent sheet become essentially one piece. Membrane 516 is disposed within a recess in perimeter framework 514 as shown in FIG. 16. The exterior appearance of membrane 516 or sheet 510 can be decorative or plain.

A plurality of spaced female receiving ports 518 can be included to mate with pegs similar to pegs 38 and 222 of the embodiments described above, to provide support around the pressure sensitive switches. Additionally, a diverter bar similar to diverter bar 160 described above can be used in conjunction with the pressure sensitive switches.

Included in FIG. 16 is an aperture 519 for an on/off switch for the light switch cover of the present invention, which can be used to manually turn the illumination of the light switch cover of the present invention off. In this embodiment, aperture 519 provides access to a pressure sensitive on/off switch (not shown), however, the on/off switch can be a toggle switch or a rocker type switch, and would include associated wiring for operation. Hence, the on/off switch for the illuminated light switch cover, shown in FIG. 16 in an embodiment using pressure sensitive switches, can be utilized with any of the embodiments described herein above that include the battery back-up and sensing circuit.

In operation, if power to the light switch is lost, the battery back-up and sensing circuit respond by illuminating the switch cover as described above. The on/off switch can then be utilized to manually turn the illuminated switch cover off.

A plurality of female receiving ports 520, can be provided in membrane 516 to receive corresponding pegs to provide support around the light switch cover on/off switch.

Figure 17:
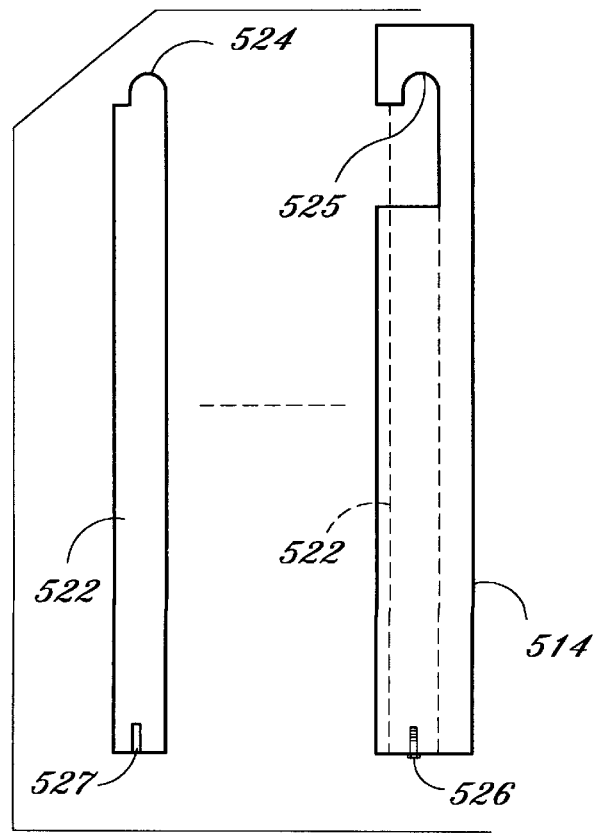
FIG. 17 is a partially exploded side elevational view of one embodiment of the present invention.

Referring now to FIG. 17, a mounting bracket 522 is shown having a shaped, in this case a domed or convex, protrusion 524. Mounting bracket 522 is attached to an electrical switch box in the manner as described herein above for the other embodiments of the invention. Frame 514 includes a shaped recess 525 that receives protrusion 524. To mount frame 514, set screw 526 is at least partially removed, recess 525 on frame 514 is set over protrusion 524 on bracket 522. Frame 514 is then slid over bracket 522 aligning set screw 526 with aperture 527. Set screw 526 is then tightened, locking frame 514 onto bracket 522.

Mounting bracket 522 can include a plurality of protruding pegs (not shown) that correspond to the female receiving ports 518 and 520, or that correspond to the female receiving ports that may be on other embodiments described herein above. Mounting bracket 522 is shown in FIG. 17 without pegs for use with the embodiment shown in FIG. 15.

Figure 18:
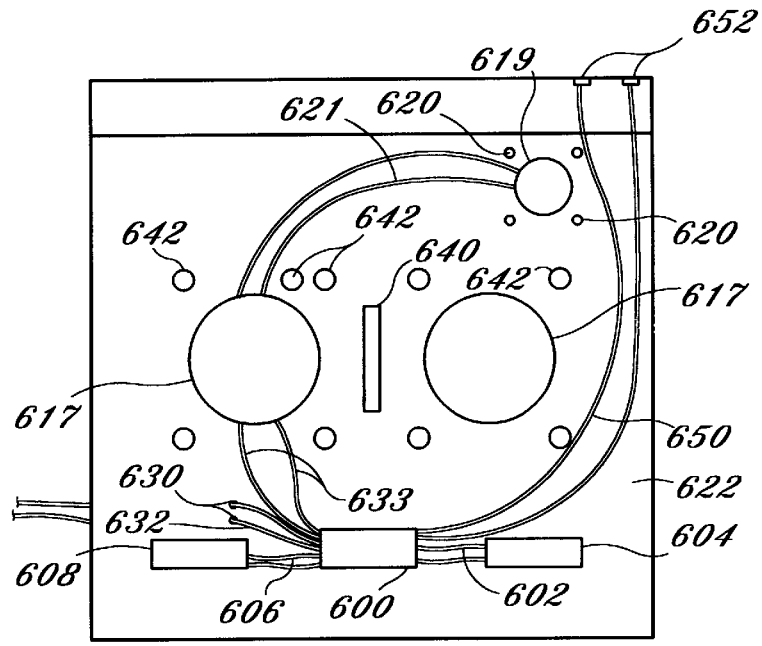
FIG. 18 is front elevational view showing the battery back-up and sensing circuit attached to the mounting bracket as an additional embodiment of the present invention.
Figure 19:
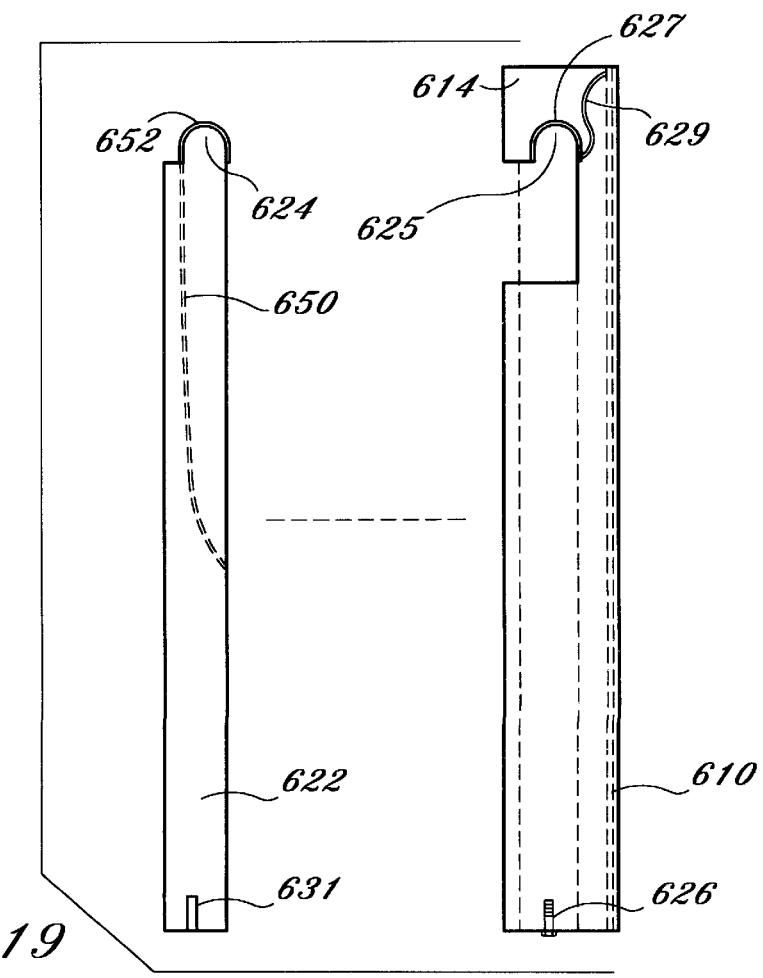
FIG. 19 is an exploded side elevational view illustrating the mounting bracket and outer frame member of the additional embodiment of the present invention.

A further embodiment of the present invention is illustrated in FIGS. 18 and 19. The battery back-up and sensing circuit for this embodiment, discussed below, operates similar to the embodiment illustrated in FIGS. 15 through 17. However, such circuit is disposed in a different location for the embodiment of FIGS. 18 and 19.

Sensing circuit 600 is connected by wires 602 to battery 504, and by wires 606 to microswitch 608. Sensing circuit 600 includes a power inverter to illuminate, for example, electroluminescent lighting sheet 610, discussed below, which can be disposed within outer frame 614.

As discussed herein above for the other embodiments of the present invention, lighting sheet 610 can serve as a flexible cover to operate one or more rocker switches or be configured to operate toggle switches or plug receptacles, and may include a decorative appearance or can be plain. Furthermore, sheet 610 can serve as a flexible cover to operate one or more pressure sensitive or push button on/off switches 617.

Lighting sheet 610 is made as a single electroluminescent sheet or can be a laminate of an electroluminescent sheet.

As stated above, a suitable sensing circuit 600 can be obtained from Capital Asset Engineering, 10650 72nd. St., Largo, Fla. 33777. The device from Capital Asset Engineering is approximately 1.645 inches long, 0.4 inches high, and 0.9 inches wide, and can convert 3, 6, 9, or 12 volts DC into AC in the range from about 60 volts AC to about 300 volts AC, and can provide frequencies in the range of about 100 hertz to about 1600 hertz. Preferably, a 3 VDC battery will be used and converted to 90 volts AC at a frequency of 600 Hz and a blink rate of 2 times per second.

It should be recognized by one of ordinary skill in the art, that other comparable power loss sensing and inverter circuits can be substituted for the Capital Asset Engineering device described above.

Sensing circuit 600, battery 604 and microswitch 603 are attached to mounting bracket 622 by any conventional means such as barrel connectors or other connectors, clips, adhesive, etc. Preferably, cutouts will be provided in mounting bracket 622 for disposal of the individual elements. A pair of apertures 630 can be provided through mounting bracket 622 for insertion therethrough of wires 632 which run from the electrical box (not shown, but conventional) to sensing circuit 600.

Where more than one switch is provided a diverter bar 640, similar to those previously discussed, may be provided. Furthermore, ports or pegs 642 can be provided on mounting bracket 622 to mate with pegs or ports (not shown), respectively, disposed on the inner surface of sheet 610. The ports and pegs function similar to those discussed above for the other embodiments.

A pair of wires 650 runs from sensing circuit to a first pair of positive and negative contacts 652. Lighting sheet 610 can be disposed within a recess in perimeter framework 614, similar to the embodiment shown in FIG. 15. As stated above, lighting sheet 610 can be replaced by any of the embodiments as described herein above.

Referring now to FIG. 19, mounting bracket 622 is shown having a shaped, in this case a domed or convex, protrusion 624. Contacts 652 are disposed on a portion of protrusion 624. Mounting bracket 622 is attached to an electrical switch box in the manner as described herein above for the other embodiments of the invention. Frame 614 includes a shaped recess 625, which includes a second pair of positive and negative contacts 627, and receives protrusion 624. When protrusion 625 is properly received within recess 625 contacts 652 and 627 are mating. A pair of wires 629 run from second set of contacts 627 to sheet 610.

Similar to the embodiment shown in FIGS. 15–17, to mount frame 614, set screw 626 is at least partially removed, and recess 625 on frame 614 is set over protrusion 624 on bracket 622. Frame 614 is then slid over bracket 622 aligning set screw 626 with aperture 631 on mounting bracket 622. Set screw 626 is then tightened, locking frame 614 onto bracket 622. Furthermore, communication is provided between contacts 652 and contacts 627

Referring now to FIG. 18, the present invention is shown for use with one or more pressure sensitive or push button on/off light switches, and the battery back-up and sensing circuit as described above. In this embodiment, switches 617 are positioned through apertures (not shown, but which correspond to the shape of a portion of the associated switch 617) of mounting bracket 622 and attached to mounting bracket 622 by conventional fasteners such as screws, bolts, etc. Thus, the switches are mounted to bracket 622 in a manner similar to the rocker and toggle switches discussed herein above.

Sheet 610 is disposed within a recess (not shown) in the perimeter of framework 614. The exterior appearance of the sheet 610 can be decorative or plain. Included in FIG. 18 is an additional aperture in mounting bracket 622 for positioning of an on/off switch 619 for the light switch cover of the present invention, which can be used to manually turn the illumination of the light switch cover of the present invention off. Switch 619 is preferably a low voltage pressure sensitive switch. A plurality of female receiving ports 620, can be provided on mounting bracket 622 to receive corresponding pegs to provide support around on/off switch 619.

Wires 621 run from on/off switch 619 protruding through its corresponding aperture to switch 617 protruding through its corresponding aperture. Furthermore, wires 632 run from sensing circuit 600 also to switch 617. On/off switches 617 and 619 can be pressure sensitive or of push button type, or a rocker type switch, and include associated wiring for operation. Hence, the on/off switch for the illuminated light switch cover, shown in FIG. 18 in an embodiment using pressure sensitive switches, can be utilized with any of the embodiments described herein above that include the battery back-up and sensing circuit.

Whenever power is lost to the conventional lighting circuitry, microswitch 608 is activated to deliver battery plower to the inverter contained within circuit 600. Circuit 600 then delivers inverted battery power to contacts 652, through wire 650. As contacts 652 mate with contacts 627, the power travels through wire 629 to sheet 610 to operate lighting sheet 610. Sheet 610 can be set to illuminate steadily or can blink on and off at a preselected frequency, as described above.

As stated above, battery 604 can be any number of selected batteries, but preferably is a lithium based battery to provide a compact battery with extended battery life.

Thus, in operation, if power to the light switch is lost, battery back-up and sensing circuit 600 respond by illuminating the switch cover (sheet 610 in the final embodiment) as described above. On/off switch 619 can then be utilized to manually turn the illuminated switch cover off.

Figure 20:
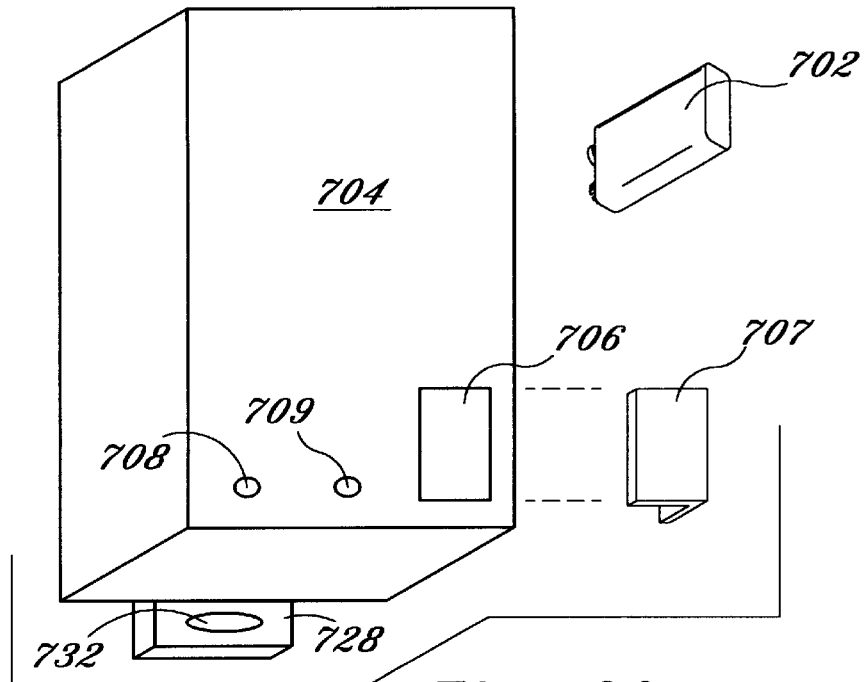
FIG. 20 is an exploded rear perspective view of yet another embodiment of the present invention.
Figure 21:
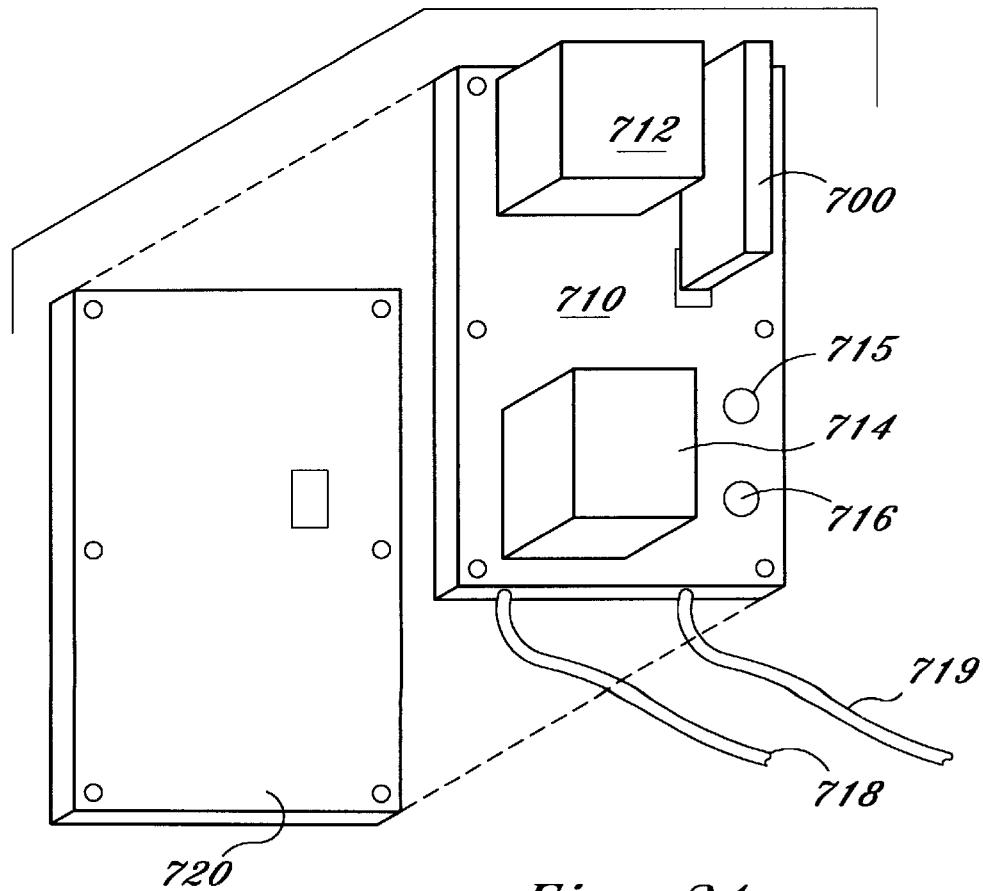
FIG. 21 is an exploded rear perspective view of the internal contents of the view illustrated in FIG. 20.

Referring to FIGS. 20 and 21, an alternate embodiment of the present invention is illustrated, including an alternate location shown for the battery back-up circuitry which includes sensing circuit 700 and battery 702. Sensing circuit 700 can be the same circuit as described herein above as circuit 500 and circuit 600 for embodiments previously described, or an alternate inverter circuit as known in the art.

As illustrated in FIG. 20, electrical box 704 can include an aperture 706 to receive battery 702. Aperture 706 can be enclosed by cover 707. Apertures 708 and 709 are sized to receive wires as further described herein below. Battery 702 is illustrated as a 9 volt battery, but can be any DC voltage battery such as 3V, 6V, 9V, 12V, and the like, and can be rechargeable with a built-in charging circuit such that periodic battery replacement is not required.

Referring to FIG. 21, sensing or inverter circuit 700, can convert any of the selected DC voltages to AC voltage, of greater than 90 volts at a frequency range of approximately 50 to 2000 hertz, to power an electroluminescent material, or light bulb, or other device as utilized herein, and can provide steady or flashing illumination.

Inverter circuit 700 is mounted to control printed circuit (PC) board 710. PC board 710 can include switching control circuitry 712, output control circuitry 714, battery terminals 715 and 716, and wires 718 and 719. Wires 718 and 719 can be replaced by terminal screws for attachment of user wires. Upon assembly, wires 718 and 719 are inserted through apertures 708 and 709 in box 704. Wires 718 and 719 are connected to house wiring for supplying typical house current as conventionally utilized for lights and other in-home appliances, which can be 110–120 volts AC or 220 volts AC.

A positive contact multi-switch PC board 720, call be connected to PC board 710, or alternately positive contact switches can be mounted directly to PC board 710. The switches can be any of the switch devices previously disclosed herein, and can include optional input devices such as timers, motion sensors, sound sensors, and the like. The switches mounted to PC board 720, or alternately directly on PC board 710, send command signals to switching and output control circuitry 712 and 714, to control the user's load, and the illumination of the cover plate lighting device. As previously described herein, the cover plate illumination can be activated whenever the light or other load is turned off, and the illumination can be deactivated whenever the light or other load is turned-on.

The switching and output control circuitry 712 and 714 can control standard user loads such as 15 or 20 amps, such as for lights, TVs, and other home appliances. Higher loads of up to approximately 100 amps are possible. Output control 714 can include relay contacts for 2-way and 3-way instant or time delayed on/off control, solid state controls such as TRIAC (AC switch), or silicon controlled rectifier (SCR) for variable output devices such as a dimmer, or other solid state controls for custom applications.

Figure 22:
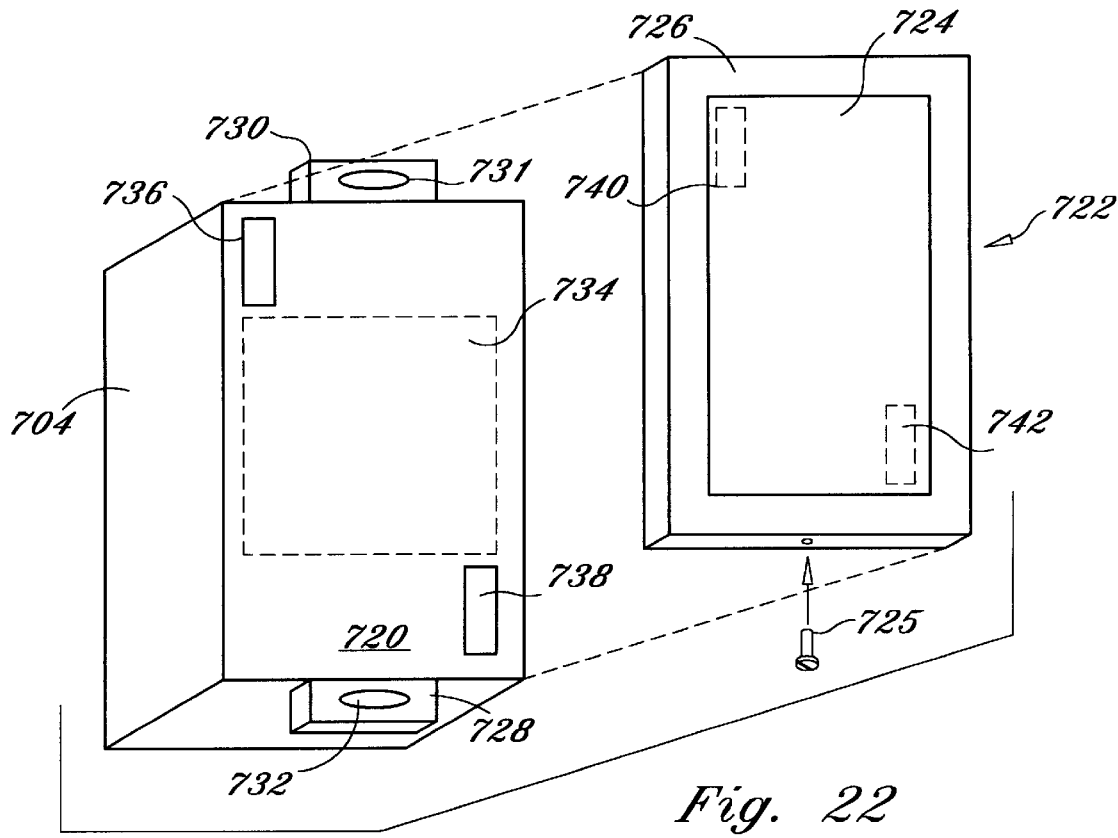
FIG. 22 is an exploded front perspective view of the embodiment of FIGS. 20 and 21.

Referring to FIG. 22, one embodiment of cover plate 722 includes electroluminescent lite 724 held within frame 726. Frame 726 can be any of the frames as described in the embodiments herein above, and can be made of a suitable plastic material. Frame 726 can be attached to the front of box 704 and held in place by set screw 725. Mounting tabs 728 and 730 can be attached to a conventional wall box receiving device by conventional screws passing through apertures 731 and 732, in conventional manner. Front multi-switch PC board 720, which alternately could be PC board 710, includes switch area 734, and spring-loaded contacts 736 and 738. Contacts 736 and 738 extend upward of front PC board 720 and make contact with socket pad areas 740 and 742, which are utilized in place of electrical wires as illustrated on embodiments heretofore described. At least one of contacts 736 and 738 can include a switch which activates the power being supplied to electroluminescent lite 724. Therefore, unless cover 722 is in place on box 704 depressing spring-loaded contacts 736 and 738, power will not be supplied at contacts 736 and 738.

The embodiment described above and in FIGS. 20–22 comprises an AC switching device for switching AC power to nearly any output load. Input control to the switching device can be via manual switches, motion, sound, or other input mechanism.

In operation, the device or devices to be switched, which can include any of the devices described herein above, is connected to output control 714. Switching control is then accomplished via one or more preselected switches connected to input switching control PC board 710. A separate multi-switch PC board 720, which can include a plurality of switches, can be mounted to PC board 710. The switches can include any of the switching devices discussed herein above.

For example, the output device may be a wall outlet connected to a lamp. The switch can be a manual switch, such as pressure sensitive push-button switch. Alternately, the output device could be an alarm, and the switch could be a motion sensor, or a audio sensor. Multiple output devices and switches can be utilized with each electroluminescent lighting sheet.

Figures 23, 24:
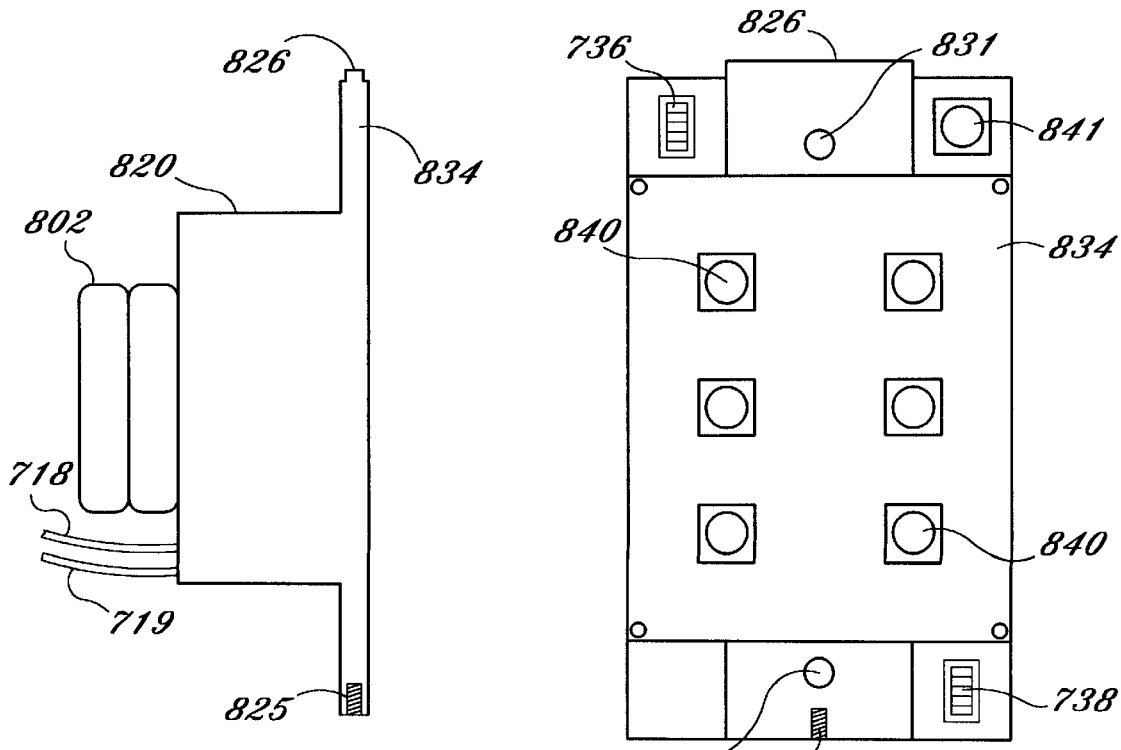
FIG. 23 is a side elevational view of a preferred embodiment of that shown in FIGS. 20–22.
FIG. 24 is front elevational view of that of FIG. 23

Referring to FIGS. 23–25, a preferred embodiment of that shown in FIGS. 20–22, is illustrated, with identical components having the same reference numerals. Referring to FIG.

23, batteries 802 are preferably rechargeable NiCad batteries mounted to the rear of box 820. Box 820 includes front plate 834 which has screw socket 825 on one end and shoulder 826 on the opposite end, as seen in FIGS. 23 and 24.

Referring to FIG. 24, plate 834 includes spring loaded contacts 736 and 738, one or more tactile switches 840, and electroluminescent lighting sheet on/of switch 841. Spring loaded contacts 736 and 738 include a jumper connection provided by the electroluminescent lighting sheet that prevents the contacts from being energized unless the electroluminescent lighting sheet is in place. In other words, on/off switch 841 will not energize contacts 736 and 738 unless lighting sheet 724 is in place.

Box 820 is mounted to a wall via conventional fasteners through apertures 831 and 823, or by other suitable manner.

Figure 26:
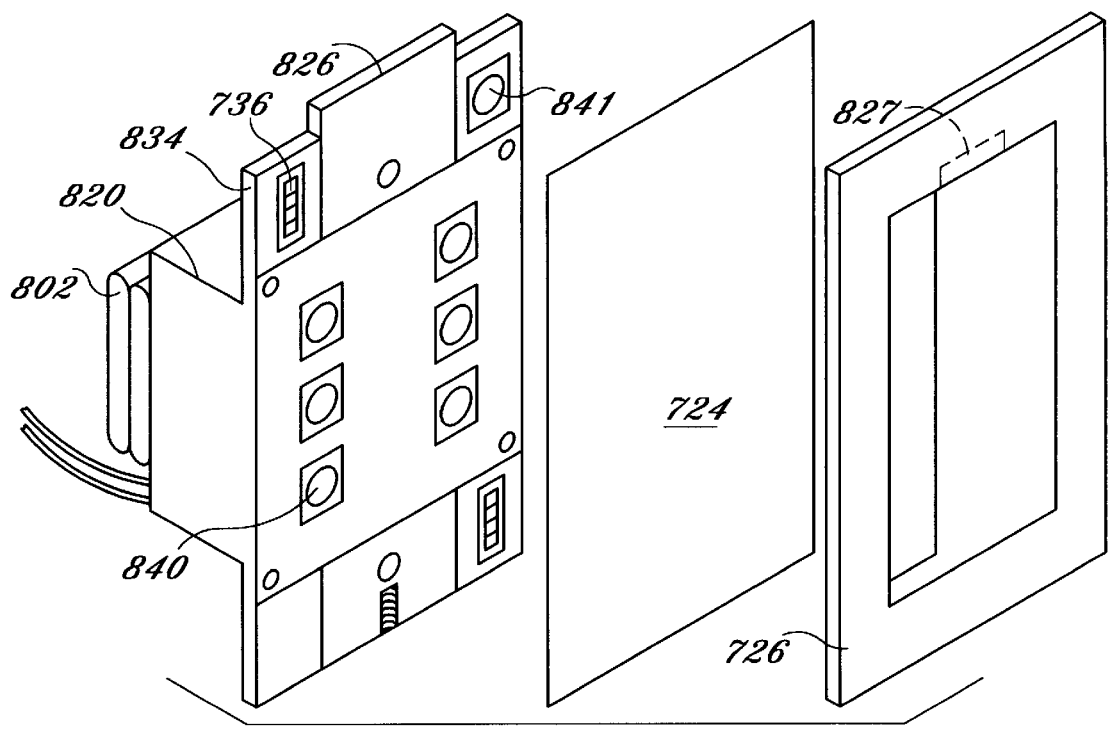
FIG. 26 is an exploded perspective view of that shown in FIGS. 23, 24, and 25.

Shoulder 826 fits into recess 827 on frame 726, as shown in FIG. 25. FIG. 26 illustrates an exploded assembly of the embodiment of FIGS. 23–25. To assemble, sheet 724 is placed within frame 726, and recess 824 of frame 726 is set onto shoulder 826. Frame 726 is then pressed against the front of plate 834 and set screw 725 is secured into socket 825. Switches 840 and switch 841 are then accessible through flexible electroluminescent sheet 724.

As illustrated in FIGS. 23–26, six switches 840 are illustrated, but could be any number from one to six or more. Switches 840 are used to switch any preselected load as described herein above. Switches 840 could be replaced with nearly any type of switching device including motion sensors, audio sensors, and the like. Switch 841 turns electroluminescent lighting sheet 724 "on" and "off".

Figure 29:
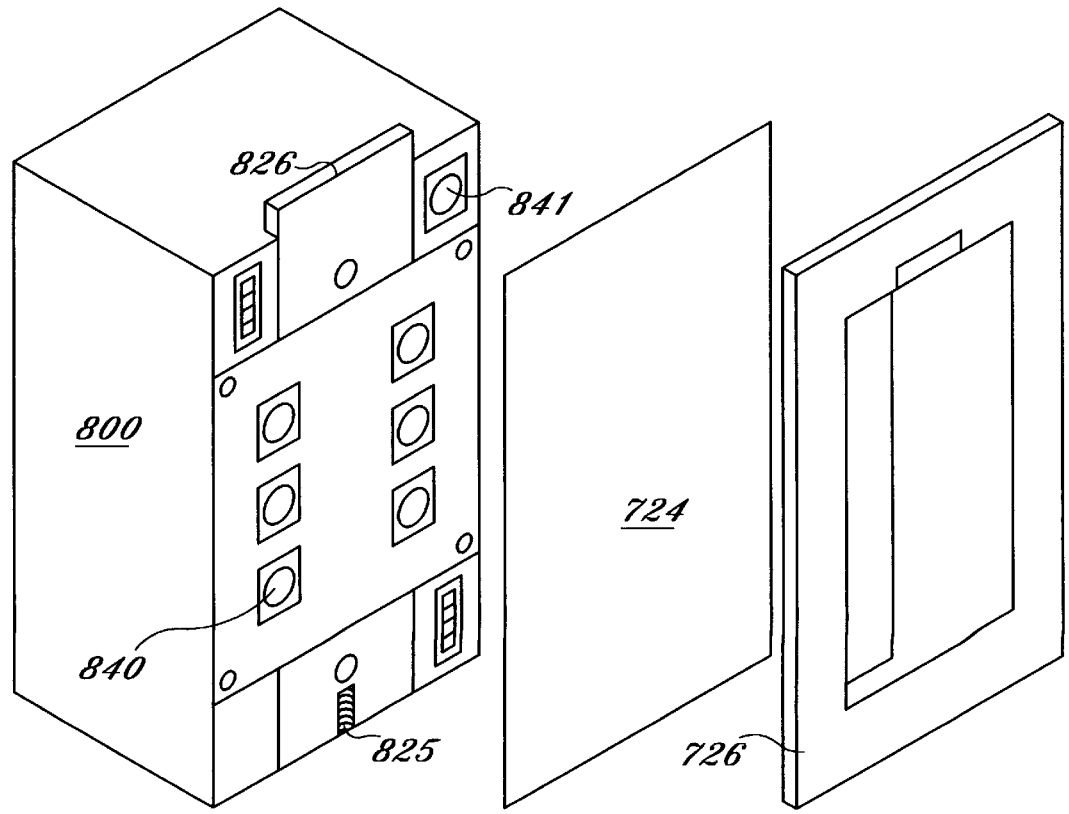
FIG. 29 is an exploded perspective view of that of FIGS. 27 and 28.

Referring to FIGS. 27, 28, and 29, a portable version of the embodiment shown in FIGS. 23–26 is illustrated having enclosure 800, which covers the rear of the invention and a plurality of batteries 802. In the portable embodiment, AC power may not be available for recharging of batteries 802. A solar cell 810 can be used for recharging batteries 802. In addition, batteries 802 can be charged from a DC source, such as a cigarette lighter adapter for interface to an automobile. The additional batteries 802 can provide sufficient power to energize electroluminescent sheet 734 for approximately 24 hours or longer.

The enclosure 800 is preferably a waterproof enclosure that can include a conventional gasket or seal (not shown) to prevent water entry into the battery compartment or rear of plate 834. The enclosure can be plastic and can be buoyant enough such that the portable embodiment floats.

The portable embodiment can be utilized as a portable switching controller or as a simple portable night-light that can be used where no AC power is available, such as when camping. When used as a portable night-light, switches 840 can control the brightness of the electroluminescent sheet 724. For example, sheet 726 can be made to glow bright, medium, and low depending on the desires of the user.

The other components of the portable embodiment not specifically described are the same as the embodiment illustrated in FIGS. 23–26 and described herein above The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An illuminated switching device for controlling AC powered loads, comprising:
    a source of AC power;
    means for switching said source of AC power to at least one load;
    a face plate member having an outer surface, a rigid perimeter portion, and a flexible portion within said rigid perimeter portion;
    means for illuminating said outer surface;
    means for attaching said face plate member to said means for switching so that said means for switching is operable through said flexible portion;
    at least one battery;
    means for sensing power loss from said source of AC power, said means for sensing power loss electrically connected to said at least one battery and including an inverter electrically connected to said means for illuminating said outer surface;
    wherein when power from said source of AC power is lost, said outer surface is illuminated until power is restored.

2. The device of claim 1 wherein said means for switching includes at least one manual switch.

3. The device of claim 1 wherein said means for switching includes a plurality of switches for controlling AC power to a plurality of loads.

4. The device of claim 1 wherein said means for illuminating said outer surface includes a pair of electrical contacts mateable with a pair of spring-loaded electrical contacts mounted on said means for switching.

5. The device of claim 1 wherein said at least one load can draw up to approximately 20 amps.

6. The device of claim 1 wherein said at least one load can draw greater than approximately 20 amps.

7. The device of claim 1 wherein said means for switching is activated by motion.

8. The device of claim 1 wherein said means for switching is activated by sound.

9. The device of claim 1 wherein said means for switching includes at least one relay for switching said source of AC power to said at least one load.

10. The device of claim 9 wherein said relay is time delayed.

11. The device of claim 1 wherein said means for switching includes a solid state device for switching said source of AC power to said at least one load.

12. A portable night-light, comprising;
    an enclosure having means for switching attached thereto;
    a face plate member having an outer surface, a rigid perimeter portion, and a flexible portion within said rigid perimeter portion;
    means for illuminating said outer surface;
    means for attaching said face plate member to said enclosure so that said means for switching is operable through said flexible portion;
    at least one battery;
    means for recharging said at least one battery;
    wherein said means for switching activates and deactivates said means for illuminating said outer surface.

13. The device of claim 12 wherein said means for switching further controls said means for illuminating by controlling an intensity of illumination.

14. An illuminated switching device, comprising:
    means for controlling a source of power;
    a face plate including a flexible member;
    means for attaching said face plate so that it covers said means for controlling and said means for controlling is operable through said flexible portion;

an illumination member associated with said means for controlling; and means for energizing said illumination member when power from said source of power is lost.

15. The illuminated switching device of claim 14 wherein illumination member is an electroluminescent lamp disposed on an inner surface of said flexible portion.

16. The illuminated switching device of claim 14 wherein said means for controlling includes at least one manual switch.

17. The illuminated switching device of claim 14 further including means for adjusting the brightness of said illumination member.

18. The illuminated switching device of claim 14 wherein said illumination member includes a pair of electrical contacts mateable with a pair of spring-loaded electrical contacts associated with said means for controlling.

19. The illuminated switching device of claim 14 wherein said means for energizing said illumination member is at least one battery.

20. The illuminated switching device of claim 19 further including means for recharging said at least one battery.

* * * * *